United States Patent Office 2,758,598
Patented Aug. 14, 1956

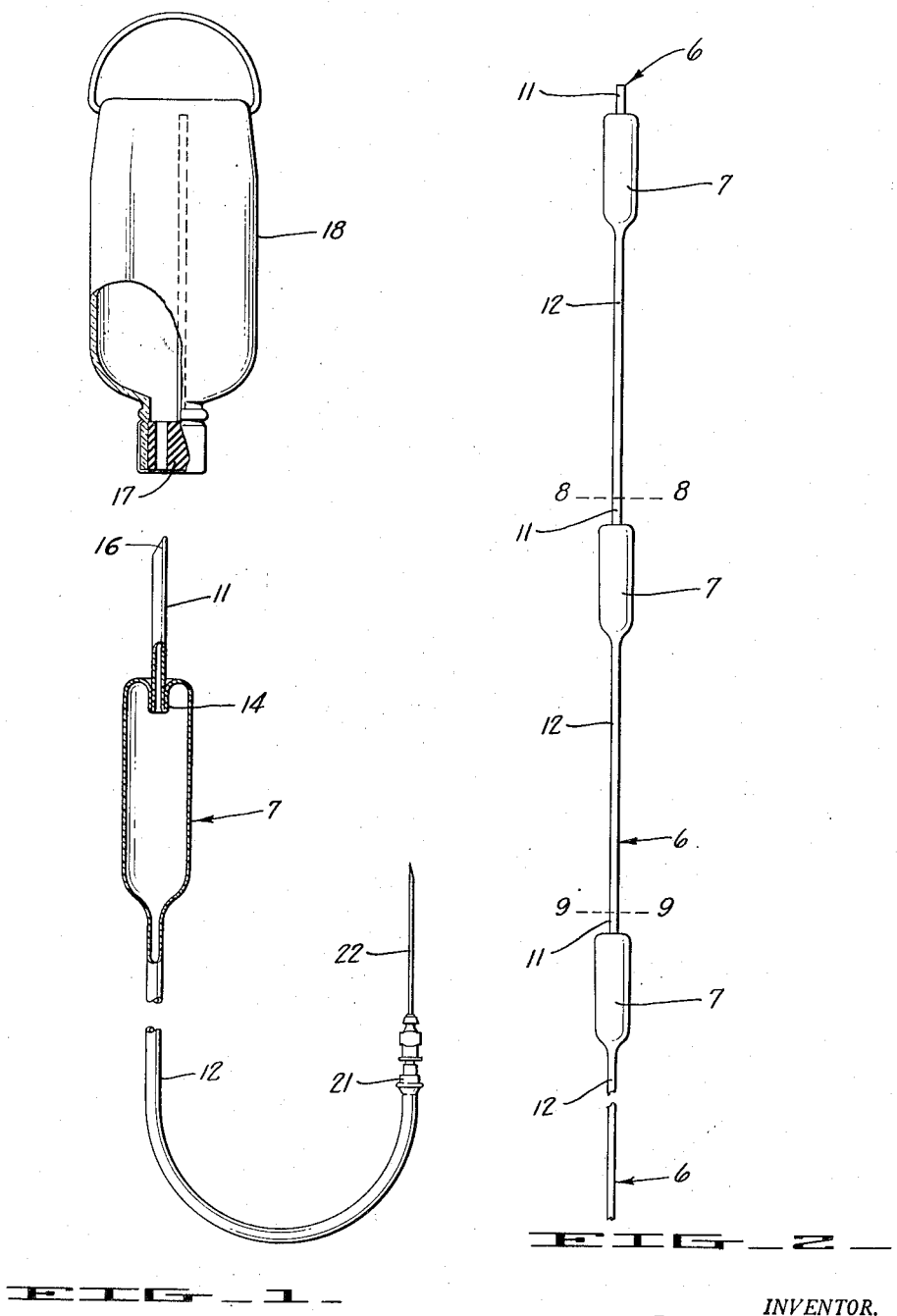

2,758,598

VENOCLYSIS EQUIPMENT

Robert Kennedy Cutter, Berkeley, Calif., assignor to Cutter Laboratories, Inc., a corporation of California Application January 24, 1955, Serial No. 483,579

4 Claims. (Cl. 128—214)

This invention relates to venoclysis equipment.

In the procedure followed in giving an injection of blood or other fluid, it is essential that the rate of flow of the fluid be observed and controlled. Usual venoclysis equipment includes a flow-meter, a device enabling an operator to control fluid flow; such meters generally consist of a transparent cylindrical chamber having a depending nipple from which the liquid drips so that the character of the solution and the rate at which the injection is proceeding can be ascertained by visual observation. The present practice is to construct such drip-meters as separate units and assemble each with a suitable length or lengths of a flexible tubing. When assembled, the drip-meter and the attached flexible tubing are then sterilized.

In accordance with the present invention, I provide a drip-meter and the tubing of a flexible, transparent, synthetic plastic material such as one of the well-known synthetic resins, e. g., vinyl. Further, in accordance with this invention, the drip-meter is formed as an integral part of the tubing, thus reducing materially the cost of fabrication and assembly. In addition, since the accessory equipment is made in a continuous length, the possibility of leaks is eliminated. It will be obvious that the leakage of air into such equipment is highly undesirable either prior to use or during use. Further, the equipment can be sterilized in a relatively simple manner, as by using steam. Additionally, since the entire assembly is made of a material which is not subject to breakage, as is glass, the durability of the equipment is materially increased, a factor of importance inasmuch as such equipment is frequently used under emergency conditions. Finally, under some emergency conditions, it is desirable to effect the liquid transfer to a patient as rapidly as possible and it is not unusual under these conditions to apply pressure to the liquid to increase the flow rate. In an apparatus which is free of any joints or in which the number of these is reduced, the likelihood of leakage at a joint is either eliminated or reduced as is the expense of providing a fluid-tight joint.

It is in general the broad object of the present invention to provide a drip-meter and the accessory flexible tubing of a one-piece transparent flexible synthetic plastic tubing to reduce the cost of such equipment, to provide equipment which can be readily sterilized, and which is safer to use.

Another object of the present invention is to provide a novel drip-meter and flexible tube construction for use in the giving of intravenous injections.

The invention includes other objects and features of advantage, some of which, together with the foregoing, will appear hereinafter wherein the present preferred form of venoclysis equipment embodying this invention is disclosed. In the drawing accompanying and forming a part hereof, Figure 1 is a side elevation, partly in section, showing a partial venoclysis equipment set-up suitable for the giving of an infusion.

Figure 2 is a partially schematic side elevation showing a step in the manufacture of the venoclysis equipment embodying the present invention.

In the drawing, I have indicated a length of transparent flexible synthetic plastic tubing generally indicated at 6, this having a plurality of separate drip-meters, each generally indicated at 7, disposed at regular intervals along the length thereof. The tubing is handled as a continuous length with the drip-meters formed therein at regular intervals.

The tubing is severed along the lines 8 and 9 to provide lengths of tubing 11 and 12 on each side of the drip meter. Each drip meter is provided as an enlarged portion in the length of tubing with a length of the tubing forced inwardly along the axis of the tubing, as is indicated at 14 in Figure 1, to provide a downwardly extending tubular nipple from which the solution passing into the drip-meter falls drop-by-drop, thus enabling the rate of flow of the liquid and the character of the liquid to be observed readily. The end of tubing length 11 is preferably provided with a sharpened end 16. If the tubing per se is not of sufficient stiffness, some of the plasticizer can be removed therefrom by application of a suitable solvent so that this end portion of the tubing is of sufficient stiffness to enable the end to be inserted as a spike through one of the usual rubber closures 17 in a liquid flask 18. End of tubing length 12 is usually formed with a tapered end adapted to fit within a tapered end 21 on the needle 22.

In use, following fabrication of the complete accessory equipment, that is, a drip-meter having integral and attached tubing lengths 11 and 12, with a spike end 16 and a tapered end on the respective tubing lengths 11 and 12, the ends are covered with a porous cover such as papier-mâché or a suitable porous paper covering. The completed unit is then subjected to steam sterilization and a complete sterilized unit provided which can be handled readily, is not subject to breakage, is completely transparent, is made in one-piece so that the possibility of any leaks, either prior or during use, is obviated, and with a reduction in expense and greater safety to those involved with the handling and use of the equipment.

I claim:

1. Venoclysis accessory equipment consisting of an integral length of a cylindrical tubing of a transparent flexible synthetic plastic, said tubing having one end formed as a spike for piercing insertion into a flask closure and its other end tapered for mounting within a like-tapered recess in a hollow needle, the tubing including a self-expanded portion intermediate said ends having its sidewalls of a larger internal diameter than the internal diameter of the tubing to provide a drip-meter chamber, a portion of said tubing depending into the self-expanded portion and providing a fluid discharge orifice in spaced relation to the sidewalls of the self-expanded portion to provide a drip-meter with such self-expanded portion.

2. Venoclysis accessory equipment consisting of an integral length of a cylindrical tubing of a transparent flexible synthetic plastic, said tubing having one end hardened and formed as a spike for piercing insertion into a flask closure and its other end hardened and tapered for mounting within a like-tapered recess in a hollow needle, the tubing including a self-expanded portion intermediate said ends having its sidewalls of a larger internal diameter than the internal diameter of the tubing to provide a drip-meter chamber, a portion of said tubing depending into the self-expanded portion and providing a fluid discharge orifice in spaced relation to the sidewalls of the self-expanded portion to provide a drip-meter with such self-expanded portion.

3. Venoclysis accessory equipment consisting of an integral length of a cylindrical tubing of transparent flexible synthetic plastic and including a self-expanded portion intermediate its ends, said expanded portion having its sidewalls of a larger internal diameter than the internal diameter of the tubing to provide a drip meter chamber, a portion of said tubing depending into the self-expanded portion and providing a fluid discharge orifice in spaced relation to the sidewalls of the self-expanded portion to provide a drip-meter with such self-expanded portion.

4. A one-piece accessory venoclysis equipment unit comprising a length of a transparent flexible synthetic plastic tubing having a drip-meter formed of the tubing and intermediate the ends thereof, one end of the tubing being formed to provide a spike and the other end of the tubing being formed for attachment to a needle.

References Cited in the file of this patent

UNITED STATES PATENTS

| | | |
|---|---|---|
| 1,205,410 | Tenney | Nov. 21, 1916 |
| 2,715,905 | Ogle | Aug. 23, 1955 |